United States Patent
Bell, III

[15] 3,680,983
[45] Aug. 1, 1972

[54] GAS TURBINE ENGINE BLOCK

[72] Inventor: Albert H. Bell, III, Birmingham, Mich.

[73] Assignee: General Motors Corporation, Detroit, Mich.

[22] Filed: Oct. 9, 1970

[21] Appl. No.: 79,730

[52] U.S. Cl..................417/409, 60/39.51 R, 165/9, 415/177
[51] Int. Cl.......F04b 17/00, F04b 35/00, F02c 7/02, F28d 39/00
[58] Field of Search..............60/39.51 R; 165/7, 8, 9; 417/409; 415/177

[56] References Cited

UNITED STATES PATENTS 3,202,207  8/1965  Chute...............................165/9
3,490,746  1/1970  Bell................................415/177

Primary Examiner—Robert M. Walker
Attorney—Paul Fitzpatrick and Jean L. Carpenter

[57] ABSTRACT

A regenerative gas turbine engine includes an engine block or frame having two end faces and four side faces with a bulkhead dividing the interior of the block into a chamber for high pressure air discharged from the compressor and a chamber for low pressure gas discharged from the turbine. The turbine is mounted centrally in the bulkhead and regenerator disks are mounted on two opposite faces of the block. The bulkhead defines a support for cross-arm seals of the regenerator and is of a double-walled construction providing a cooling air passage through the bulkhead tapering from one end toward the center and then diverging towards the other end of the passage.

2 Claims, 7 Drawing Figures

PATENTED AUG 1 1972 3,680,983
SHEET 1 OF 2

INVENTOR.
Albert H. Bell III
BY
Paul Fitzpatrick
ATTORNEY

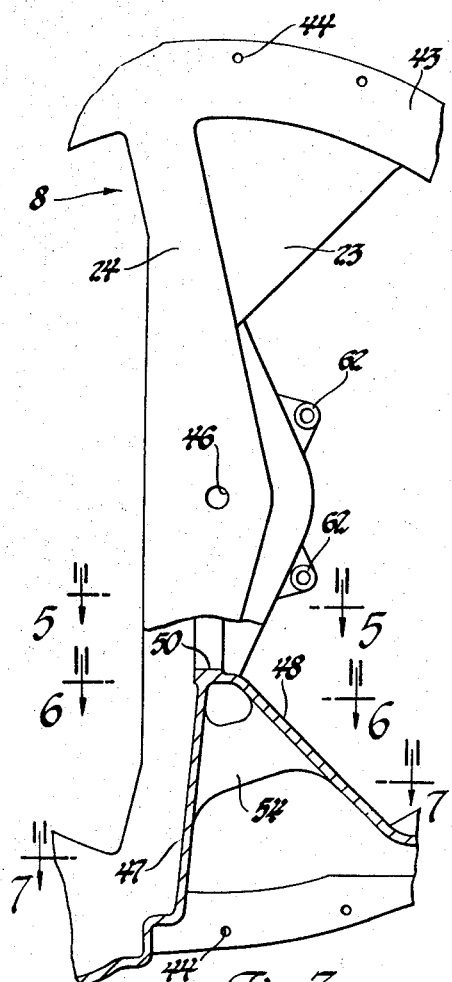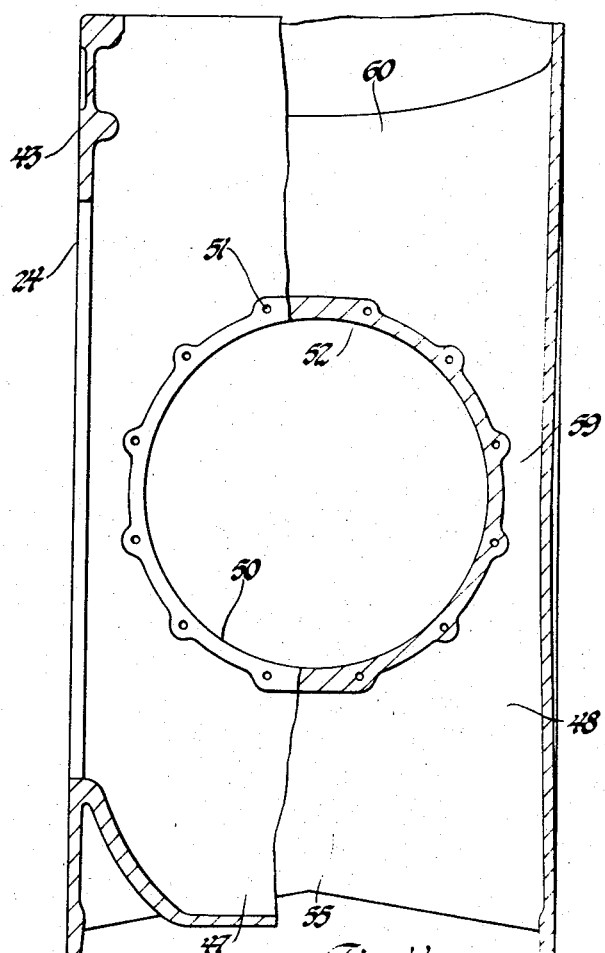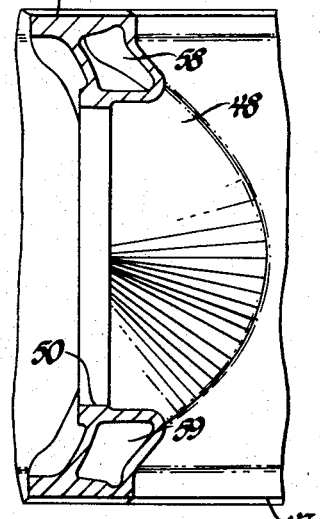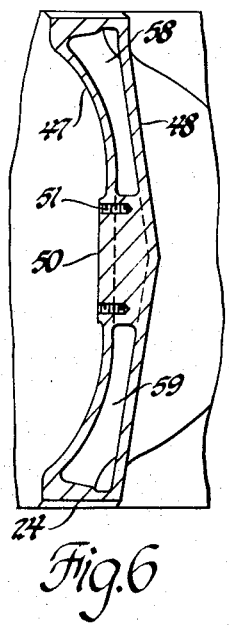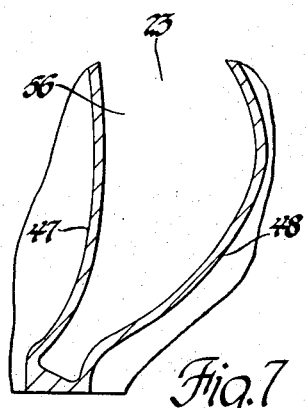

GAS TURBINE ENGINE BLOCK

My invention relates to gas turbine engines, and particularly to a frame and bulkhead structure of a regenerative gas turbine engine of a type specially suited to use in heavy vehicles.

While there may be advantages to saving weight in power plants for any sort of vehicle, it seems to be the case that the aircraft heritage of present gas turbines has overinfluenced designers of such engines in the direction of light weight. The result is that engines are designed primarily as minimum weight sheet metal structures, with attendant disadvantages. It has occurred to me that a gas turbine engine which is intended to replace a diesel engine in a heavy truck, tractor or other relatively heavy vehicle suffers very little penalty from substantial weight, and that trade-offs to reduce weight are generally inadvisable in an engine intended for such purposes.

Pursuing this thought has led to the conclusion that the frame, housing, or engine block of a regenerative gas turbine for heavy vehicle propulsion may well be a substantial or massive casting or weldment rather than a relatively flimsy fabricated sheet metal structure. The weight of a rigid casting or a weldment from relatively heavy plate is no substantial disadvantage in such an environment. The greater rigidity and ease of fabrication and the opportunity to use materials readily obtainable and castable or weldable to provide a strong rigid supporting structure for the engine and its accompanying reduction gear and accessories can be exploited beneficially by following the principles of my invention.

My invention involves another aspect; that is, of providing improved cooling of the parts of the engine block immediately adjacent the turbine and regenerator, which are quite hot, and reinforcement of the engine bulkhead structure to provide a high degree of strength and rigidity, by use of a hollow ventilated double-walled bulkhead and cross-arm seal support.

The principal objects of my invention are to provide an improved overall structure or framework, which I call an engine block, for an engine of the type referred to. A further object of the invention is to provide an exceptionally sturdy and economically feasible structure of a gas turbine engine. A further object is to provide improved arrangements for cooling and strengthening the bulkhead of a regenerative gas turbine engine. A still further object is to promote an unforced cooling air flow through the bulkhead.

The nature of my invention and its advantages will be apparent to those skilled in the art from the succeeding detailed description and accompanying drawings of the preferred embodiment of the invention.

In the drawings,

FIG. 3 is a side elevation view of a portion of the engine block, with parts cut away.

FIG. 4 is a vertical sectional view of the engine block, with parts cut away.

FIG. 5 is a horizontal sectional view taken on the plane indicated by the line 5—5 in FIG. 3.

FIG. 6 is a horizontal sectional view taken on the plane indicated by the line 6—6 in FIG. 3.

FIG. 7 is a partial horizontal sectional view taken on the plane indicated by the line 7—7 in FIG. 3.

Figure 1:
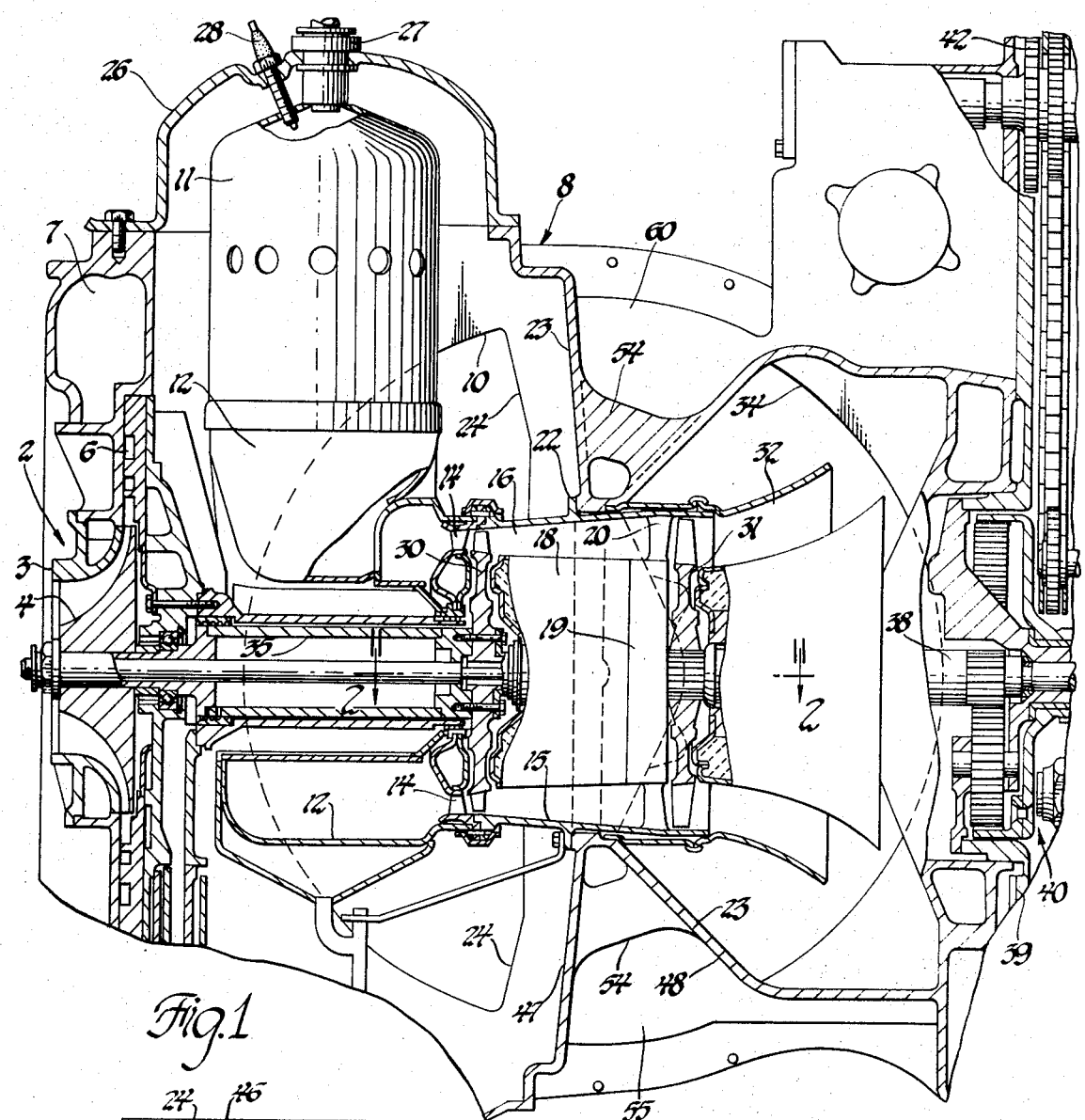
FIG. 1 is a sectional view of the major part of a regenerative gas turbine engine, taken on a plane containing the axis of rotation of the turbo-machinery, with parts broken away and in section.

My present invention is illustrated in FIG. 1 as embodied in a regenerative gas-coupled gas turbine engine similar to that described in my U.S. Pat. No. 3,490,746 granted Jan. 20, 1970. That patent is directed particularly to the rotating structure of the engine with provisions for improving cooling, sealing, and lubrication of turbine assembly. It may be referred to for further information about the engine, but sufficient of its organization will be described herein for an understanding of the invention which is the subject of this application.

Referring to FIG. 1, the engine includes a single stage radial compressor 2 having a case 3 and a rotor 4. The compressor discharges into an annular vaned diffuser 6 which in turn discharges into a generally annular plenum chamber 7 defined by the forward portion of a generally rectangular engine block or case 8, on which the case 3 and forward wall of the diffuser are mounted. The compressed air flows from the plenum chamber 7 through outlets in the side of the block and returns to the interior of the block through the forward portion of an axial-flow regenerator matrix mounted on each lateral face of the block for rotation about a horizontal axis. The regenerator matrix is not illustrated, but structure of a suitable axial-flow regenerator matrix and seal arrangement is illustrated in Bracken and Zeek U.S. Pat. No. 3,368,611, issued Feb. 13, 1968.

Figure 2:
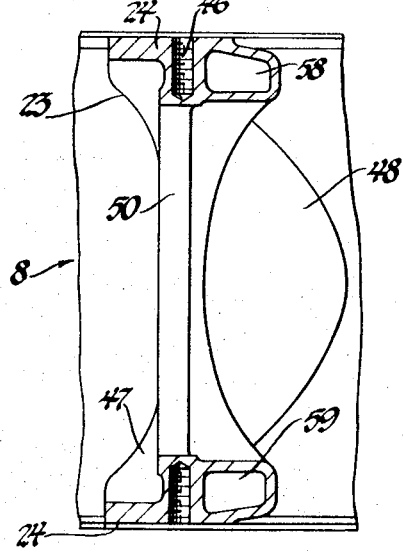
FIG. 2 is a horizontal sectional view of the engine block taken on the plane indicated by the line 2—2 in FIG. 1.

The compressed air, heated by passing through the regenerator matrix, enters the interior of the block 8 through an opening 10 in the side face of the block and flows into a combustion liner 11 within which fuel is burned and from which the combustion products flow through a scroll 12 into a first stage turbine nozzle 14. This turbine nozzle is mounted on an approximately cylindrical turbine case 15 which defines the outer wall of a motive fluid conduit 16. The inner wall of the motive fluid conduit is defined by a bearing housing 18 and an inner shroud 19 of a second stage turbine nozzle, which nozzle includes vanes 20 extending between the inner shroud and the case 15. A flange 22 extending around the turbine case 15 is bolted to a bulkhead 23 which is an integral part of the engine block 8, extending across the interior of the block and dividing it into a high pressure chamber into which the compressed air flows from the regenerator and a low pressure chamber through which the turbine exhaust is conducted to the regenerator. The lateral edges of the bulkhead define cross-arm seal supports 24 (see also FIGS. 2 and 3).

The combustion liner 11 is mounted under a removable combustion chamber cover 26 which mounts the fuel nozzle 27 to inject fuel into the liner and an igniter 28. The combustion products developed in the liner flow through the scroll 12, nozzle 14, the blades of a high pressure turbine wheel 30, the motive fluid conduit 16, nozzle vanes 20, and the blades of a low pressure turbine wheel 31. The exhaust from the low pressure turbine flows through a diffusing passage 32 into the space rearward of bulkhead 23 from which it flows through arcuate openings 34 in each side face of the engine block 8, outwardly through the regenerator matrix at each face, and into exhaust structure (not illustrated).

The high pressure turbine 30 is mounted on a shaft 35 by which the compressor rotor 4 is driven, the compressor and turbine with the combustion apparatus constituting a gas generator.

The high pressure and low pressure turbines constitute a turbine assembly generally contained within or fixed to the turbine case 15. The low pressure or power output turbine 31 is mounted on a shaft 38 supported within the bearing housing 18 and within a reduction gear case 39 within which is mounted reduction gearing 40 and accessory drive gears (not identified) which provide the drive for engine driven accessories and which include gearing 42 which is coupled to the regenerator matrices for rotation of these about their common axis of rotation.

Having described the general organization of the engine, we now proceed to consideration of the engine block 8 in more detail. As has been stated, the engine block is a generally rectangular structure having top and bottom faces, right and left side faces, and front and rear ends, the front end mounting the compressor and providing a plenum chamber into which the compressor discharges, the side faces mounting the regenerator matrices, and the enclosing covers for the matrices and exhaust outlet (not illustrated), and the rear end of the block mounting the reduction gear and accessory drive arrangement. An oil sump (not illustrated) may be provided on the bottom face of the block. Referring now generally to the drawings, the cross-arm seal support 24 which extends from top to bottom at each side of the block is shown in most of the figures. It may be noted that this is slightly concave or bowed from end to end as viewed from the outside of the block, as indicated most clearly at the right side of FIG. 4. The effect of this is to conform more closely to the matrix after it expands differentially and adopts a somewhat dish-shaped configuration in operation.

The side faces of the block 8 define circular faces 43 which provide a backing for circumferential seals between the engine block and the rotating matrix and also define bolt holes 44 by which the regenerator cover and exhaust connection is mounted. The cross-arm seal support 24 defines a threaded opening 46 at the center of rotation of the matrix into which is inserted a bolt which provides an axle on which the matrix is rotated.

The bulkhead 23 is a double-walled structure defined by a forward wall 47 and a rear wall 48. The two walls are joined at the center of the block by a turbine mounting ring 50 which is provided with threaded stud holes 51 in the forward face by which the flange 22 of the turbine case is mounted on the bulkhead. The turbine case blocks the large turbine opening 52 through the bulkhead so that the motive fluid must flow from the high pressure chamber to the low pressure chamber through the turbine.

The bulkhead is reinforced by two ribs or gussets 54 cast integral with the walls 47 and 48 and joining them on the vertical center plane of the block. The forward wall 23 is approximately flat, although curved somewhat as shown clearly in the sectional views of FIGS. 5, 6, and 7. The rear wall 48 diverges from the forward wall toward the top and bottom of the block and is of a rearwardly domed outline as shown clearly in FIGS. 5 and 7, approaching close to the forward wall 47 at the cross-arm seal support 24 and being quite substantially spaced from it on the center plane of the engine at the top and bottom of the block.

As will be apparent, this structure provides a rather large unobstructed entry for cooling air at 55 into the lower end of the air conduit defined by the hollow bulkhead. This conduit, which is indicated as 56 in FIG. 7, divides into two passages identified as 58 and 59, which pass around the turbine mounting ring 50 and turbine case 15, the two passages again uniting into an upper diverging outlet conduit 60. The natural circulation through the hollow bulkhead is thus caused to flow most rapidly adjacent the turbine which liberates a very considerable amount of heat and there is in essence a venturi effect which causes acceleration and deceleration of the air flowing upward through the passage 55 to 60 so as to flow most rapidly around the turbine mounting ring 50. The circulation of air through the bulkhead also carries away heat by conduction through the metal and convection by the air from the cross-arm seal supports 24 which are in close proximity to the matrix which is heated by the exhaust from the turbine.

The lugs 62 illustrated in FIG. 3 are provided to mount a heavy containment ring around the hollow turbine rotor 31 outside the turbine case.

It is preferred that the bulkhead be cooled by air flow induced by the chimney effect of the generally vertical heated conduit. However, air circulation may be forced by a fan or otherwise if desired, and the convergent-divergent cooling passage configuration is advantageous in this case also.

It may be noted that in practice the bulkhead will have a coating (not illustrated) of thermal insulating material over it to minimize transfer of heat by conduction from the hot turbine exhaust or by radiation from the combustion chamber and turbine case. This is common practice.

It should be apparent to those skilled in the art that the structure of the block provides an exceptionally rigid and suitable mount for the various components of the engine and accessory devices mounted on it, as well as the power takeoff through the reduction gear to drive the vehicle or other load. It should also be apparent that the structure is one readily adapted to casting and further clear that the hollow structure of the bulkhead with the converging and diverging air passage is well suited to provide a desired degree of cooling of the bulkhead without forced circulation of air.

The detailed description of the preferred embodiment of the invention for the purpose of explaining the principles thereof is not to be considered as limiting or restricting the invention, as many modifications may be made by the exercise of skill in the art without departing from the spirit of the invention.

I claim:

1. A gas turbine engine comprising, in combination, an engine block of generally rectangular outline, having two end faces and four side faces, defining an interior space, and including a bulkhead dividing the space into a high pressure chamber and a low pressure chamber; a turbine assembly mounted on the bulkhead;

a compressor driven by the turbine assembly mounted on one end face of the engine block; an output gear driven by the turbine assembly mounted on the other end face of the engine block; the engine block including means for mounting rotary regenerators on opposite side faces of the block and the bulkhead having lateral edges defining cross-arm seal supports for the regenerators; the bulkhead including a central ring for mounting the turbine assembly and two mutually spaced walls extending from the ring to the four side faces, the walls defining between them an air circulation conduit open at the top and bottom faces of the block and diverging in area from the ring in each direction, the said lateral edges of the bulkhead connecting the said bulkhead walls so that the cross-arm seal supports are cooled by circulation through the conduit.

2. An engine as recited in claim 1 in which the said engine block is an integral casting.

* * * * *